United States Patent
Isaka et al.

(10) Patent No.: US 11,254,760 B2
(45) Date of Patent: Feb. 22, 2022

(54) METHOD FOR PRODUCING PURIFIED FLUOROPOLYMER

(71) Applicant: DAIKIN INDUSTRIES, LTD., Osaka (JP)

(72) Inventors: Tadaharu Isaka, Osaka (JP); Ryouichi Fukagawa, Osaka (JP); Tadahiro Yabu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/049,861

(22) PCT Filed: Apr. 22, 2019

(86) PCT No.: PCT/JP2019/017007
§ 371 (c)(1),
(2) Date: Oct. 22, 2020

(87) PCT Pub. No.: WO2019/208492
PCT Pub. Date: Oct. 31, 2019

(65) Prior Publication Data
US 2021/0246237 A1  Aug. 12, 2021

(30) Foreign Application Priority Data
Apr. 26, 2018 (JP) .............................. JP2018-085278

(51) Int. Cl.
*C08F 8/22* (2006.01)
*C08F 6/00* (2006.01)
(Continued)

(52) U.S. Cl.
CPC ............... *C08F 8/22* (2013.01); *C08F 6/005* (2013.01); *C08F 114/26* (2013.01); *C08J 3/12* (2013.01)

(58) Field of Classification Search
None
See application file for complete search history.

(56) References Cited

U.S. PATENT DOCUMENTS

| 4,626,587 A | 12/1986 | Morgan et al. |
| 4,743,658 A | 5/1988 | Imbalzano et al. |

(Continued)

FOREIGN PATENT DOCUMENTS

| CN | 1997673 A | 7/2007 |
| EP | 3 256 501 A0 | 12/2017 |

(Continued)

OTHER PUBLICATIONS

International Preliminary Report on Patentability dated Oct. 27, 2020 with translation of the Written English Opinion from the International Bureau in International Application No. PCT/JP2019/017007.

(Continued)

*Primary Examiner* — Nicole M. Buie-Hatcher
(74) *Attorney, Agent, or Firm* — Sughrue Mion, PLLC

(57) ABSTRACT

Provided is a method for producing a purified fluoropolymer containing less fluoridable end groups. The production method includes: (a) melting a fluoropolymer to give a molten fluoropolymer; (b) reducing a reaction inhibitor in the molten fluoropolymer; (c) bringing the molten fluoropolymer into contact with an active substance after the step (b); and (d) removing a volatile matter from the molten fluoropolymer after the step (c).

7 Claims, 1 Drawing Sheet

(51) Int. Cl.
*C08F 114/26* (2006.01)
*C08J 3/12* (2006.01)

(56) References Cited

U.S. PATENT DOCUMENTS

| | | | |
|---|---|---|---|
| 6,451,962 B1* | 9/2002 | Hiraga | C08J 3/00 |
| | | | 528/480 |
| 7,208,569 B2* | 4/2007 | Chapman | C08F 6/005 |
| | | | 525/359.1 |
| 2005/0245725 A1 | 11/2005 | Chapman et al. | |
| 2009/0030154 A1 | 1/2009 | Isogai et al. | |
| 2011/0159402 A1* | 6/2011 | Honda | H01M 8/1093 |
| | | | 429/483 |
| 2017/0154707 A1 | 6/2017 | Abe et al. | |
| 2018/0186914 A1* | 7/2018 | Taguchi | C08F 214/265 |

FOREIGN PATENT DOCUMENTS

| | | |
|---|---|---|
| GB | 1 210 794 A | 10/1970 |
| JP | 60-171110 A | 9/1985 |
| JP | 62-104822 A | 5/1987 |
| JP | 2006-505680 A | 2/2006 |
| JP | 2015-516024 A | 6/2015 |
| WO | 2004/044014 A2 | 5/2004 |
| WO | 2009/014138 A1 | 1/2009 |
| WO | 2013/169571 A1 | 11/2013 |
| WO | 2016/031675 A1 | 3/2016 |
| WO | 2016/130911 A1 | 8/2016 |

OTHER PUBLICATIONS

International Search Report for PCT/JP2019/017007 dated Jul. 9, 2019 (PCT/ISA/210).
Extended European Search Report dated Dec. 21, 2021 for counterpart European Application No. 19793295.7.

* cited by examiner

METHOD FOR PRODUCING PURIFIED FLUOROPOLYMER

CROSS REFERENCE TO RELATED APPLICATIONS

This application is a National Stage of International Application No. PCT/JP2019/017007 filed Apr. 22, 2019, claiming priority based on Japanese Patent Application No. 2018-085278 filed Apr. 26, 2018.

TECHNICAL FIELD

The disclosure relates to methods for producing a purified fluoropolymer.

BACKGROUND ART

Fluoropolymers at completion of the polymerization contain unstable end groups, and techniques of reducing unstable end groups in fluoropolymers have been proposed.

For example, Patent Literature 1 discloses a method for carrying out a chemical reaction using a fluoropolymer or with an impurity in a fluoropolymer, including: (a) melting the fluoropolymer; (b) bringing the molten fluoropolymer isolated from the melting step into contact with a reactant, wherein the contact is carried out in a reaction region having a free volume; (c) subdividing the molten fluoropolymer in the reaction region to enable effective contact of the reactant with the molten fluoropolymer for the purpose of carrying out the chemical reaction between the reactant and the molten fluoropolymer; (d) removing a volatile matter in the molten fluoropolymer obtained by isolation from the steps (b) and (c); and (e) cooling the fluoropolymer from which the volatile matter has been removed, wherein the subdividing step involves a step of dividing the molten fluoropolymer in the reaction region more than once into at least six molten fluoropolymer streams.

CITATION LIST

Patent Literature

Patent Literature 1: JP 4801353 B

SUMMARY OF INVENTION

Technical Problem

The disclosure aims to provide a method for producing a purified fluoropolymer containing less fluoridable end groups.

Solution to Problem

The disclosure relates to a method for producing a purified fluoropolymer, including: (a) melting a fluoropolymer to give a molten fluoropolymer; (b) reducing a reaction inhibitor in the molten fluoropolymer; (c) bringing the molten fluoropolymer into contact with an active substance after the step (b); and (d) removing a volatile matter from the molten fluoropolymer after the step (c).

The step (b) preferably involves a step of bringing the molten fluoropolymer into contact with an inactive substance.

The active substance is preferably a fluorinating agent. The fluorinating agent is preferably $F_2$.

The inactive substance is preferably nitrogen gas or carbon dioxide gas.

The fluoropolymer is preferably a polymer containing a tetrafluoroethylene-based polymerized unit.

The reaction inhibitor is preferably a volatile matter, $O_2$, or $H_2O$.

The step (d) preferably involves bringing the molten fluoropolymer into contact with an inactive substance.

The step (b) preferably involves bringing the molten fluoropolymer into contact with an inactive substance under pressurization.

The step (c) preferably involves bringing the molten fluoropolymer into contact with the active substance under pressurization.

Advantageous Effects of Invention

The production method of the disclosure having the above configuration can provide a purified fluoropolymer containing less fluoridable end groups.

DESCRIPTION OF EMBODIMENTS

Figure 1:
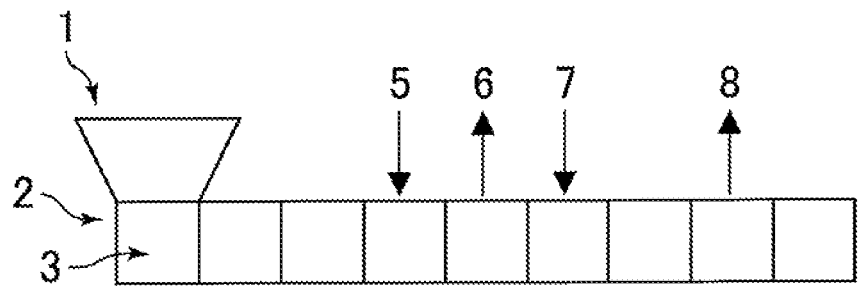
FIG. 1 is a view schematically illustrating an example of the production method of the disclosure.

Stabilization of unstable end groups has conventionally been attempted. Stabilization by conventional methods, however, is inefficient and unreacted end groups are likely to remain. The inventors made intensive studies to find out that reduction of reaction inhibitors prior to the reaction between a molten fluoropolymer and an active substance enables efficient reduction of fluoridable end groups such as unstable end groups. Thus, they developed the production method of the disclosure.

Hereinbelow, the production method of a purified fluoropolymer of the disclosure is specifically described.

The production method of the disclosure includes: (a) melting a fluoropolymer to give a molten fluoropolymer; (b) reducing a reaction inhibitor in the molten fluoropolymer; (c) bringing the molten fluoropolymer into contact with an active substance after the step (b); and (d) removing a volatile matter from the molten fluoropolymer after the step (c).

The production method of the disclosure can be practiced using, for example, an extruder. Specifically, an extruder to be used includes a raw material supply part into which a fluoropolymer is fed, a plasticization zone in which the fluoropolymer is melted by heating, a reaction inhibitor reduction zone in which reaction inhibitors in the molten fluoropolymer are reduced, an active substance addition zone in which an active substance is introduced to bring the molten fluoropolymer into contact with the active substance, and a volatile matter removal zone in which a volatile matter is removed. The production method of the disclosure can be practiced by feeding a fluoropolymer through the raw material supply part and sequentially passing the fluoropolymer through these zones.

In the extruder, multiple cylinders are combined to configure the raw material supply part, the plasticization zone, the reaction inhibitor reduction zone, the active substance addition zone, the volatile matter removal zone, and an extruding part. The fluoropolymer fed into the extruder is transferred by means of an extrusion screw (close bladed screw) of the extruder.

The extruder which allows maintenance of the fluidity of a molten fluoropolymer during its transfer is usable in the production method of the disclosure. The extruder used may be a single extruder or a connection of multiple extruders.

The extruder may be a twin-screw extruder. The screw of the twin-screw extruder can be configured by combining appropriately selected various screw elements.

Examples of the screw elements include a kneading disk that has a conveyance ability to the feed side and a dispersing/mixing/kneading function, a kneading disk that does not have a conveyance ability neither to the feed side nor the return side and has a dispersing/mixing/kneading function (see FIGS. 7 and 8 of EXAMPLES of JP 2002-120271 A, for example), a back kneading disk that has a conveyance ability to the return side and a dispersing/mixing/kneading function (see FIGS. 2, 3, 9, and 10 of EXAMPLES of JP 2002-120271 A, for example), a seal ring that has an effect of blocking a resin (see the seal ring disclosed in JP H07-124945 A, for example), and a reverse flight (see FIGS. 11 and 12 of EXAMPLES of JP 2002-120271 A).

The extruder preferably has a high self-cleaning property. The extruder with a high self-cleaning property is preferably a screw-type extruder. The screw-type extruder is preferably a twin-screw extruder because arrangement of appropriate screws in accordance with the application facilitates formation of a melt seal and its narrow residence time distribution enables continuous operation. Formation of a melt seal enables introduction of an inactive substance or an active substance under pressurization, improving the efficiency of reducing reaction inhibitors and the efficiency of reducing fluoridable end groups.

The fluoropolymer may be a melt-fabricable fluororesin. Examples of the melt-fabricable fluororesin include: TFE/HFP copolymers (FEP) such as a tetrafluoroethylene/hexafluoropropylene copolymer and tetrafluoroethylene/hexafluoropropylene/perfluoro(alkyl vinyl ether); tetrafluoroethylene/perfluoro(alkyl vinyl ether) copolymers (PFA) such as a tetrafluoroethylene/perfluoro(methyl vinyl ether) copolymer (MFA) and a tetrafluoroethylene/perfluoro (propyl vinyl ether) copolymer; a vinylidene fluoride homopolymer (PVdF); an ethylene/tetrafluoroethylene copolymer (ETFE), and a chlorotrifluoroethylene homopolymer (PCTFE). The fluoropolymer may also be a polymer obtained by copolymerizing any of the above polymers with another monomer. Specific examples thereof include a tetrafluoroethylene/hexafluoropropylene/perfluoroalkyl vinyl ether copolymer, an ethylene/tetrafluoroethylene/hexafluoropropylene copolymer, and a chlorotrifluoroethylene/tetrafluoroethylene/perfluoro(alkyl vinyl ether) copolymer.

The fluoropolymer is preferably a polymer containing a tetrafluoroethylene-based polymerized unit, more preferably a perfluoropolymer in which the monomer constituting the main chain is a perfluoromonomer, still more preferably at least one selected from the group consisting of FEP and PFA.

The fluororesin may be obtained by any conventionally known polymerization method. Examples of the method include solution polymerization and emulsion polymerization. The fluoropolymer to be melted by heating is obtained as follows. Fluororesin particles dispersed in a liquid material after completion of the polymerization are aggregated, and the aggregates are collected by filtration, followed by drying. The type and concentration of a polymerization initiator used in the polymerization, the polymerization temperature, and the polymerization pressure are not limited.

The fluoropolymer obtained by the polymerization normally has fluoridable end groups such as a —COF group, a —COOH group, a —CH$_2$OH group, a —CONH$_2$ group, a —COOCH$_3$ group, a —CF$_2$H group, —CF=CF— group, and a —CF=CF$_2$ group. The production method of the disclosure can efficiently reduce such end groups of the fluoropolymer.

Hereinbelow, each step of the production method of the disclosure is more specifically described.

In the step (a), a fluoropolymer is melted to give a molten fluoropolymer. The fluoropolymer can be melted by heating. The conditions for the heat-melting such as temperature and time are not limited as long as the fluoropolymer can be melted, and may be appropriately determined in accordance with factors such as the melting point of the fluoropolymer used. For example, the temperature may be equal to or higher than the melting point of the fluoropolymer.

Specifically, the temperature may be 50° C. to 400° C. in accordance with the type of the fluoropolymer. The temperature in the step (a) is more preferably 100° C. or higher, still more preferably 150° C. or higher, particularly preferably 170° C. or higher, while more preferably 380° C. or lower, still more preferably 350° C. or lower, particularly preferably 330° C. or lower.

The step (a) is carried out in the plasticization zone of the extruder described above. The plasticization zone preferably has a heating system. The fluoropolymer melted in the plasticization zone is transferred to the reaction inhibitor reduction zone.

In the step (b), reaction inhibitors in the molten fluoropolymer are reduced.

Examples of the reaction inhibitors include a volatile matter, oxygen (O$_2$), and water (H$_2$O) contained in the fluoropolymer.

Examples of the volatile matter include a low molecular weight compound such as an oligomer contained in the fluoropolymer, an unreacted monomer, an impurity such as a by-product, a remaining polymerization solvent, and gas generated by pyrolysis, such as HF and COF$_2$.

The presence of such reaction inhibitors in the molten fluoropolymer lowers the efficiency of the reaction caused by the contact between the molten fluoropolymer and the active substance in the step (c) described later. The production method of the disclosure can reduce the reaction inhibitors present in the molten fluoropolymer through the step (b) prior to the step (c), whereby the efficiency of the reaction in the step (c) is enhanced.

The temperature during the step (b) depends on the type of the fluoropolymer fed. Still, the temperature is preferably 50° C. to 400° C. A temperature of lower than 50° C. may cause insufficient fluidity of the fluoropolymer, leading to insufficient mixing of the fluoropolymer with the inactive substance. In such a case, removal of the reaction inhibitors is not likely to be promoted. A temperature of higher than 400° C. may cause degradation of the fluoropolymer. The temperature during the step (b) is more preferably 100° C. or higher, still more preferably 150° C. or higher, particularly preferably 170° C. or higher, while more preferably 380° C. or lower, still more preferably 350° C. or lower, particularly preferably 330° C. or lower.

The temperature during the step (b) may be equal to or higher than the melting point of the fluoropolymer.

Examples of the method for reducing the reaction inhibitors in the molten fluoropolymer include a method of bringing the molten fluoropolymer into contact with an inactive substance and a method of performing decompression treatment on the molten fluoropolymer.

First, a description is given on the method of bringing the molten fluoropolymer into contact with an inactive substance.

The inactive substance may be a gas or a liquid, and is preferably an inert gas. The inert gas is preferably nitrogen gas ($N_2$), carbon dioxide gas ($CO_2$), helium gas, or argon gas. In terms of cost, more preferred is $N_2$ or $CO_2$.

The inert gas may be used alone or two or more types thereof may be used in combination.

The method of bringing the molten fluoropolymer into contact with an inactive substance may be, for example, a method of providing an introduction hole through which an inactive substance can be introduced into the cylinder of the extruder containing the molten fluoropolymer and introducing the inactive substance into the cylinder through the introduction hole.

In the case of a gaseous inactive substance, the extruder is preferably provided with an injector for feeding a high-pressure gas adjusted to an appropriate pressure into the cylinder through the introduction hole.

In other words, the step (b) preferably involves bringing the molten fluoropolymer into contact with an inactive substance under pressurization. The contact with an inactive substance under pressurization can further reduce the reaction inhibitors, whereby the reaction caused in the step (c) is carried out more efficiently. Thus, the purified fluoropolymer to be obtained can contain less fluoridable end groups.

The pressure is preferably 0.1 MPa or higher, more preferably 0.2 MPa or higher, still more preferably 0.5 MPa or higher from the standpoint of reducing the reaction inhibitors.

A higher pressure leads to lower partial pressures of the reaction inhibitors, whereby the efficiency of reducing the reaction inhibitors is enhanced. The upper limit of the pressure is not limited, and is preferably 50 MPa. A pressure of higher than 50 MPa is less likely to give removal efficiency commensurate with the pressure. The upper limit is more preferably 7 MPa.

The pressure can be measured using a pressure gauge.

In the case of using an extruder, the pressure can be measured using a pressure gauge placed at the entrance of the introduction hole provided in the cylinder configuring the reaction inhibitor reduction zone.

The amount of the inactive substance fed is not limited. In terms of enhancing the reduction efficiency of the reaction inhibitors, preferred is the amount that makes the pressure within the above range by addition of the inactive substance.

For example, the amount is preferably 0.1% by mass or more, more preferably 1.0% by mass or more, while preferably 20% by mass or less, more preferably 15% by mass or less, relative to 1 kg of the fluoropolymer.

In the case of employing the method in which the inactive substance is introduced into the cylinder as described above, the cylinder is preferably further provided with a vent hole through which the inactive substance is discharged. In a preferred embodiment of the step (b), an inactive substance is introduced into the cylinder containing the molten fluoropolymer, and after the molten fluoropolymer comes into contact with the inactive substance, the inactive substance is discharged from the cylinder.

In the case of a liquid inactive substance, a liquid feeding means such as a pump is preferably provided for continuous injection through the introduction hole provided in the cylinder. The liquid inactive substance is preferably discharged from the cylinder after the molten fluoropolymer comes into contact with the inactive substance as in the case of a gaseous inactive substance.

In the production method of a purified fluoropolymer of the disclosure, upon reduction of reaction inhibitors by contact between the molten fluoropolymer and an inactive substance, the molten fluoropolymer is preferably brought into contact with an inactive substance dispersed in the fluororesin. In other words, they preferably contact with each other in a foam state. The foam state can provide a larger area of the interface between the inactive substance and the molten fluoropolymer to enhance the reduction efficiency of reaction inhibitors, which allows downsizing of the treatment equipment.

The state where the inactive substance is dispersed in the fluoropolymer is achieved, for example, by a method of selecting the screw structure in the cylinder to control the flow of the resin.

More specifically, an extruder used may have a screw structure that makes a fluoropolymer fill the cylinder upon extrusion without introduction of an inactive substance in a reaction inhibitor reduction zone that is one region of tandemly connected cylinders. The extruder may also have an inactive substance introduction part for introducing an inactive substance and an inactive substance discharge part for discharging the inactive substance and reaction inhibitors. The inactive substance introduction part and the inactive substance discharge part are each connected to the reaction inhibitor reduction zone. A melting treatment is performed while an inactive substance is introduced from the inactive substance introduction part and the inactive substance and reaction inhibitors are discharged from the inactive substance discharge part, whereby the state where the inactive substance is dispersed in the fluoropolymer is achieved.

The phrase "fluoropolymer fills the cylinder" refers to the absence of a free space in the cylinder. The cylinder is not necessarily completely filled with the fluoropolymer in the case where a volatile matter is vaporized to partly occupy a space in the cylinder, for example.

The screw structure that makes the fluoropolymer fill the cylinder upon extrusion of the fluoropolymer can be achieved by, for example, providing a seal ring at each end of the reaction inhibitor reduction zone, or providing a kneading screw element upstream of the back kneading disk.

The use of such an extruder enables efficient dispersion of the inactive substance in the molten fluoropolymer because the inactive substance injected into the cylinder filled with the fluoropolymer in the reaction inhibitor reduction zone is subjected to shearing by rotation of a screw of a dispersive mixing screw element placed just behind the inactive substance injection part. In the above method, preferably, the inactive substance is injected, dispersed, and made into a foam state under pressurization that is achieved by increasing the fluoropolymer filling rate and kneading the contents.

In the step (b), the inactive substance introduced from the inactive substance introduction part and the fluoropolymer may be mixed. The fluoropolymer filling the cylinder in the reaction inhibitor reduction zone of the extruder and the inactive substance are mixed using a screw having a dispersing/mixing/kneading function, such as a kneading disk provided in the reaction inhibitor reduction zone. Thus, in the case of a gaseous reaction inhibitor reduction zone, the reaction inhibitor reduction zone incorporated is highly dispersed in the fluoropolymer to be in a foam state. In this case, diffusion of a volatile matter in the fluoropolymer starts through the interface between the foam and the polymer.

In the case of a liquid inactive substance, the screw elements are configured to make the polymer pressure at the inactive substance introduction part equal to or higher than the vapor pressure of the liquid, whereby the inactive substance is dispersed in a liquid state and is rapidly vaporized to foam when decompressed at the inactive substance discharge part. In this case, diffusion of a volatile matter in the fluoropolymer into bubbles starts upon beginning of the foaming phenomenon, through the interface between the bubbles and the polymer. In the reaction inhibitor reduction zone, bubble collapse occurs due to rapid decompression, and the volatile matter contained in the bubbles is discharged to the outside through the vent hole.

The time for the step (b), for example, the time for the molten fluoropolymer to pass through the reaction inhibitor reduction zone (e.g., inside the cylinder provided with an inactive substance introduction part and an inactive substance discharge part), is not limited, and is typically shorter than 10 minutes though it depends on the set temperature, the amount of the inactive substance, and the structure of the extruder. The step (b) for 10 minutes or longer tends to cause excessive shearing force on the fluoropolymer and degradation thereof. Within the above range, the time is preferably 0.2 minutes or longer and not longer than three minutes. The step (b) for shorter than 0.2 minutes is likely to cause insufficient removal efficiency.

The inactive substance introduced from the inactive substance introduction part is brought into contact with the molten fluoropolymer, and then preferably discharged from the inactive substance discharge part together with reaction inhibitors.

The inactive substance discharge part can be connected to the cylinder in the reaction inhibitor reduction zone described above. The reaction inhibitor reduction zone is preferably composed of multiple cylinders, preferably two or more cylinders, more preferably two to four cylinders. The use of multiple cylinders can give a temperature gradient in the reaction inhibitor reduction zone to stabilize the temperature control in the reaction inhibitor reduction zone, thereby stabilizing the physical properties and the discharge speed of the fluoropolymer extruded from the extruder.

The discharge may be carried out naturally through the vent hole provided in the cylinder or by a method of drawing the inactive substance and reaction inhibitors from the fluoropolymer in the cylinder under decompression by means of an discharge nozzle and a vacuum pump connected to the vent hole to discharge them to the outside of the extruder (vacuum venting).

The pressure (absolute pressure) at the discharge part depends on the molten state of the fluoropolymer and the operation conditions of the twin-screw extruder, such as the screw speed, but is preferably reduced to the extent that the fluoropolymer does not flow into the discharge nozzle in the inactive substance discharge part. For example, the pressure may be set to 0.1 MPa or lower.

In the case of using an extruder, the pressure is measured at a piping part connected to the outlet of the vent hole.

The step (b) may involve performing decompression treatment on the molten fluoropolymer.

The decompression treatment can be carried out, for example, by the method of drawing reaction inhibitors from the fluoropolymer in the cylinder under decompression by means of a discharge nozzle and a vacuum pump connected to the vent hole provided in the cylinder to discharge them to the outside of the extruder (vacuum venting) as described above for the discharge of the inactive substance.

The pressure depends on the molten state of the fluoropolymer and the operation conditions of the twin-screw extruder, such as the screw speed, but is preferably reduced to the extent that the fluoropolymer does not flow into the discharge nozzle connected to the vent hole. For example, the pressure can be set to 0.1 MPa or lower, more preferably 0.09 MPa or lower, still more preferably 0.07 MPa or lower.

In the case of using an extruder, the pressure is measured at a piping part connected to the outlet of the vent hole.

The step (c) involves bringing the molten fluoropolymer into contact with an active substance after the step (b). The active substance is preferably a substance that can convert a fluoridable end group possibly present at an end of the fluoropolymer.

Examples of the fluoridable end group include a —COF group, a —COOH group (free or bonded), a —CH$_2$OH group, a —CONH$_2$ group, a —COOCH$_3$ group, a —CF$_2$H group, a —CF═CF— group, and a —CF═CF$_2$ group.

The active substance is preferably a fluorinating agent. Examples of the fluorinating agent include fluorine-containing compounds such as F$_2$ gas, CoF$_3$, AgF$_2$, UF$_6$, OF$_2$, N$_2$F$_2$, CF$_3$OF, and halogen fluorides (e.g., IF$_5$, ClF$_3$). From the standpoint of reaction efficiency, the fluorinating agent is preferably F$_2$ gas.

The reaction is particularly preferably such that a fluoridable end group reacts with a fluorinating agent to be converted to a —CF$_3$ group.

The use of the active substance enables fluorination of a fluoridable end group.

In the production method of the disclosure, the step (c) is carried out after the step (b) to improve the reaction efficiency in the step (c). Thus, a purified fluoropolymer containing less fluoridable end groups can be obtained.

In the step (c), an end group of the fluoropolymer is brought into contact with an active substance to cause a chemical reaction. If the step (b) is not carried out, the fluoropolymer contains many reaction inhibitors, and the reaction inhibitors react with the active substance to inhibit the reaction between a fluoridable end group in the fluoropolymer and the active substance. In the production method of the disclosure, the step (b) prior to the step (c) reduces the reaction inhibitors, which presumably improves the reaction efficiency between the end group in the fluoropolymer and the active substance.

In the step (c), a reaction between substances such as a volatile matter in the molten fluoropolymer and an active substance may also proceed.

The contact between the molten fluoropolymer and the active substance may be carried out either collectively or separately in multi-steps. Separation into multi-steps may facilitate delicate adjustment of the degree of the reaction.

The temperature in the step (c) may be appropriately set in accordance with the amount and type of the fluoropolymer used and the type of the active substance, for example. From the standpoint of the reaction efficiency, the temperature in the step (c) is preferably 20° C. or higher, more preferably 80° C. or higher, while preferably 400° C. or lower, more preferably 380° C. or lower.

The step (c) preferably involves bringing the molten fluoropolymer into contact with an active substance under pressurization. The contact under pressurization can further improve the reaction efficiency.

In an exemplary method for the contact under pressurization, an active substance adjusted to an appropriate pressure is injected from the introduction hole provided in the cylinder of the extruder. The contact between the active substance and the molten fluoropolymer under pressurization can further reduce fluoridable end groups in the purified fluoropolymer to be obtained.

The pressure is preferably 0.1 MPa or higher, more preferably 0.2 MPa or higher, still more preferably 0.5 MPa or higher.

The upper limit of the pressure is not limited, and is preferably 50 MPa, more preferably 7 MPa.

In the case of using an extruder, the pressure is measured at the entrance of the introduction hole for introducing an active substance.

The amount of the active substance used in the step (c) may be appropriately determined in accordance with the type and amount of the fluoropolymer used. For example, the amount is preferably 100 ppm or more, more preferably 1000 ppm or more, while preferably 20000 ppm or less, more preferably 10000 ppm or less, relative to 1 kg of the fluoropolymer.

In the step (c), a mixture of an active substance and an inactive substance may be used. For example, a mixed material containing 10 to 90 vol % of an active substance (e.g., fluorinating agent) and 10% to 90% of an inactive substance (e.g., $N_2$ gas) may be used.

The step (d) involves removing a volatile matter from the molten fluoropolymer after the step (c). The step (d) after the step (c) can remove not only a remaining volatile matter but also the active substance such as a fluorinating agent introduced in the step (c), a compound generated in the step (c) (e.g., fluorine-containing compounds such as $F_2$, HF, $COF_2$), and water.

In the step (d), a volatile matter may be removed from the molten fluoropolymer by any method. In the case of using an extruder, providing a vent hole in the cylinder included in the extruder allows natural discharge of a volatile matter or the active substance.

The method described above for the step (b) may also be employed. Specifically, the method of bringing an inactive substance into contact with the molten fluoropolymer and the method of performing a decompression treatment on the molten fluoropolymer may be mentioned.

It is also preferred that the method of bringing an inactive substance into contact with the molten fluoropolymer or the method of performing decompression treatment on the molten fluoropolymer is carried out after a volatile matter is naturally discharged from the vent hole as described above.

Specifically, the following methods may be mentioned: (i) a volatile matter is naturally discharged after the step (c) from the vent hole provided in the cylinder through which the molten fluoropolymer passes; (ii) a volatile matter is discharged in a decompression state after the step (c) from the vent hole provided in the cylinder through which the molten fluoropolymer passes; and (iii) after discharge of a volatile matter by the method (i) or (ii), an inactive substance is further introduced into the cylinder from the introduction hole provided in the cylinder to bring the molten fluoropolymer into contact with the inactive substance, and the inactive substance is discharged from the vent hole for discharging the inactive substance. Also employable is a method (iv) of introducing an inactive substance into the cylinder from the introduction hole provided in the cylinder to bring the molten fluoropolymer into contact with the inactive substance without performing the discharge by the method (i) or (ii), followed by discharging the inactive substance from the vent hole for discharging the inactive substance.

The temperature in the step (d) may be any temperature that allows the fluoropolymer to have fluidity. For example, the same temperature range as that for the step (b) may be employed.

The fluoropolymer after the step (d) is extruded in a molten state through a die and cooled to be solidified, whereby a purified fluoropolymer in a desired shape is obtained.

The purified fluoropolymer may be formed into any desired shape, for example, by selecting the shape of the die at the extrusion port of the extruder. In terms of the versatility, the purified fluoropolymer is preferably pelletized. The obtained pellet can be fed into another molding machine for production of a desired molded article.

The production method of the disclosure can provide a purified fluoropolymer containing less fluoridable end groups. For example, in the obtainable purified fluoropolymer, the total number of a —COF group, a —COOH group, a —$CH_2OH$ group, a —$CONH_2$ group, a —$COOCH_3$ group, a —$CF_2H$ group, and a —$CF=CF_2$ group is 50 or less relative to $10^6$ main-chain carbon atoms.

The number of fluoridable end groups can be determined using an FT-IR spectrometer 1760X (produced by Perkin Elmer) by infrared spectroscopy by the method described in U.S. Pat. No. 3,085,083 B and JP 2005-298659 A.

Hereinbelow, preferred embodiments of the production method of the disclosure are described.

According to a preferred embodiment, the production method of the disclosure is a method for producing a purified fluoropolymer using an extruder equipped with a cylinder, the method including: (a1) heating a fluoropolymer in the cylinder to give a molten fluoropolymer; (b1) introducing an inactive substance into the cylinder containing the molten fluoropolymer to bring the molten fluoropolymer into contact with the inactive substance, followed by discharging of the inactive substance; (c1) introducing an active substance into the cylinder after the step (b1) to bring the molten fluoropolymer into contact with the active substance; and (d1) removing a volatile matter after the step (c1) from a volatile matter discharge part provided in the cylinder containing the molten fluoropolymer.

The production method can be carried out using a twin-screw extruder configured to have a plasticization zone provided with a raw material supply part and a heating system, a reaction inhibitor reduction zone provided with an inactive substance supply hole and an inactive substance discharge hole, an active substance addition zone provided with an active substance supply part, and a volatile matter removal zone provided with a volatile matter discharge part in this order.

Introduction of an active substance in the step (c) may be carried out either collectively or separately in multi-steps. Separation into multi-steps may facilitate delicate adjustment of the degree of the reaction.

The above method is more specifically described with reference to drawings.

FIG. 1 is a view schematically illustrating an example of the production method of the disclosure. In an extruder shown in FIG. 1, a first cylinder serves as a raw material supply part and second and third cylinders serve as a plasticization zone for melting a fluoropolymer. A fourth cylinder is provided with an inactive substance introduction part for introducing an inactive substance into the cylinder (arrow 5). A fifth cylinder is provided with a vent hole for discharging the introduced inactive substance and reaction inhibitors (e.g., a volatile matter) (arrow 6). In this case, the region composed of the fourth and fifth cylinders can be considered as a reaction inhibitor removal zone.

A sixth cylinder is provided with an active substance introduction part for introducing an active substance (arrow 7). The introduced active substance is brought into contact with the molten fluoropolymer to react with a fluoridable end group in the molten fluoropolymer. In this case, the region composed of the sixth cylinder can be considered as an active substance addition zone.

An eighth cylinder is provided with a vent hole for discharging a remaining volatile matter, the introduced active substance, and elements generated by the reaction (arrow 8). In this case, the region composed of the eighth cylinder can be considered as a volatile matter removal zone.

Owing to such a configuration, reaction inhibitors can be reduced prior to the reaction between an active substance and a molten fluoropolymer, which enables an efficient reaction between the active substance and the molten fluoropolymer. Thus, the purified fluoropolymer to be obtained can contain less fluoridable end groups.

Figure 2:
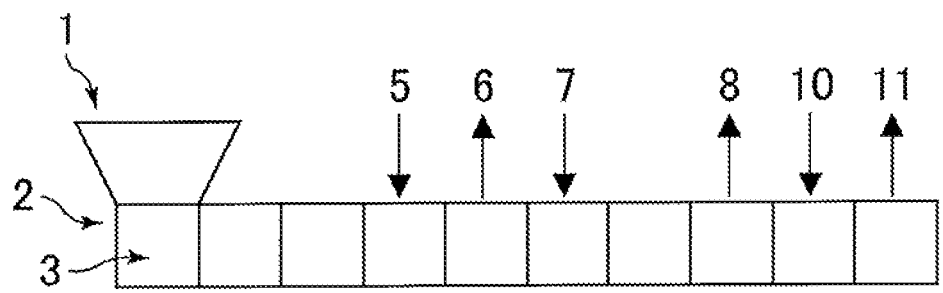
FIG. 2 is a view schematically illustrating an example of the production method of the disclosure.

Also preferred is an embodiment illustrated in FIG. 2. Specifically, a ninth cylinder is provided with an inactive substance introduction part for introducing an inactive substance into the cylinder (arrow 10) after introduction and reaction of an active substance and discharge of a remaining volatile matter, the introduced active substance, and elements generated by the reaction (arrow 8). A tenth cylinder is provided with a vent hole for discharging the introduced inactive substance (arrow 11). Such a configuration enables further removal of a volatile matter remaining in the fluoropolymer and the introduced active substance.

Figure 3:
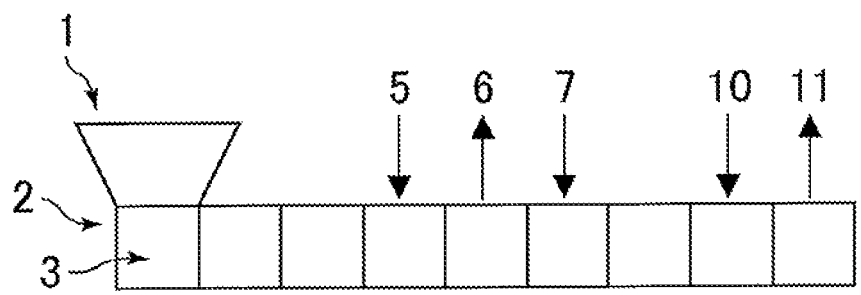
FIG. 3 is a view schematically illustrating an example of the production method of the disclosure.

Alternatively, as illustrated in FIG. 3, the eighth cylinder may be provided with an inactive substance introduction part for introducing an inactive substance into the cylinder (arrow 10) after introduction and reaction of an active substance, and the ninth cylinder may be provided with a vent hole for discharging the introduced inactive substance (arrow 11).

According to a preferred embodiment, the production method of the disclosure is a method for producing a purified fluoropolymer using an extruder equipped with a cylinder, the method including: (a2) heating a fluoropolymer in the cylinder to give a molten fluoropolymer; (b2) discharging a reaction inhibitor contained in the molten fluoropolymer to the outside of the cylinder by decompression; (c2) introducing an active substance into the cylinder after the step (b2) to bring the molten fluoropolymer into contact with the active substance; and (d2) removing a volatile matter after the step (c2) from a volatile matter discharge part provided in the cylinder containing the molten fluoropolymer.

The production method can be carried out using a twin-screw extruder configured to have a plasticization zone provided with a raw material supply part and a heating system, a reaction inhibitor reduction zone provided with a reaction inhibitor discharge part, an active substance addition zone provided with an active substance supply part, and a volatile matter removal zone provided with a volatile matter discharge part in this order.

The above method is more specifically described with reference to a drawing.

Figure 4:
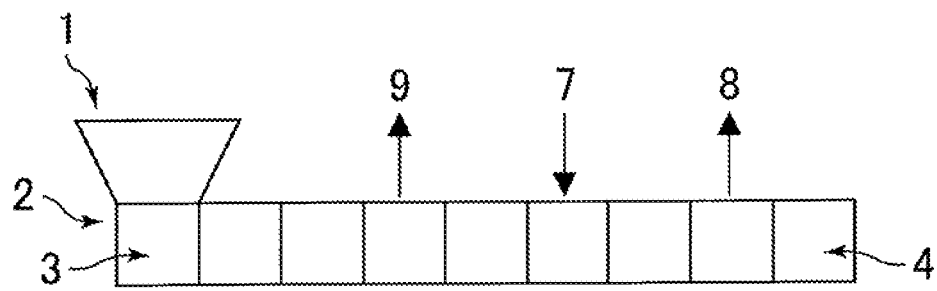
FIG. 4 is a view schematically illustrating an example of the production method of the disclosure.

FIG. 4 is a view schematically illustrating an example of the production method of the disclosure. In an extruder shown in FIG. 4, a first cylinder serves as a raw material supply part and second and third cylinders serve as a plasticization zone for melting a fluoropolymer. A fourth cylinder is provided with a reaction inhibitor discharge part. A vacuum pump is connected to the reaction inhibitor discharge part to draw a volatile matter or reaction inhibitors from the molten fluoropolymer (arrow 9 (vacuum venting)). In this case, the region composed of the fourth cylinder can be considered as a reaction inhibitor reduction zone. A sixth cylinder is provided with an active substance introduction part for introducing an active substance (arrow 7). The introduced active substance is brought into contact with the molten fluoropolymer to react with a fluoridable end group in the molten fluoropolymer. In this case, the region composed of the sixth cylinder can be considered as an active substance addition zone. An eighth cylinder is provided with a volatile matter discharge part for discharging a remaining volatile matter, the introduced active substance, and elements generated by the reaction (arrow 8). Owing to such a configuration, reaction inhibitors can be reduced prior to the reaction between an active substance and a molten fluoropolymer, which enables an efficient reaction between the active substance and the molten fluoropolymer. Thus, the purified fluoropolymer to be obtained can contain less fluoridable end groups.

After discharge of a remaining volatile matter, the introduced active substance, and elements generated by the reaction (arrow 8), introduction and discharge of an inactive substance may be carried out as in the embodiment shown in FIG. 2. As in the embodiment shown in FIG. 3, after the reaction between the active substance and the molten fluoropolymer, introduction and discharge of an inactive substance may be carried out without discharge indicated by the arrow 8.

According to the method for producing a purified fluoropolymer of the invention, the purified fluoropolymer to be obtained can contain less fluoridable end groups. Also, the amount of a volatile matter remaining in the purified fluoropolymer to be obtained can be reduced.

EXAMPLES

The fluoropolymer of the disclosure is described with reference to, but not limited to, the following examples.

The characteristics herein were determined by the following methods.

(Number of Fluoridable End Groups)

The number of —COF groups, —COOH groups (free or bonded), —$CH_2OH$ groups, —$CONH_2$ groups, —$COOCH_3$ groups, —$CF_2H$ groups, and —CF=$CF_2$ groups was determined by the following method.

The fluoropolymer obtained in any of the examples and comparative example was melted at 330° C. to 340° C. for 30 minutes, and formed into a 0.25- to 0.3-mm-thick film by compression molding. The film was scanned 40 times using a Fourier transform infrared spectrometer (FT-IR (product name: 1760X, produced by Perkin Elmer)), and an infrared absorption spectrum was obtained by analysis of the scanning data. A difference spectrum was obtained based on the obtained infrared absorption spectrum and a base spectrum of a completely fluorinated fluoropolymer containing no functional group. The number N of functional groups relative to $1 \times 10^6$ carbon atoms in a specimen was calculated by the following equation (A) based on the absorption peak of end groups in the difference spectrum.

$$N = I \times K / t \quad (A)$$

I: absorbance
K: correction coefficient
t: film thickness (mm)

For reference, the absorption frequency, molar absorption coefficient, and correction coefficient of the end groups herein are shown in Table 1. The molar absorption coefficient was determined based on the FT-IR data of a low molecular weight model compound.

TABLE 1

| Functional group | Absorption frequency (cm$^{-1}$) | Molar absorption coefficient (l/cm/mol) | Correction coefficient | Model compound |
| --- | --- | --- | --- | --- |
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

(Mass Reduction by Heating)

An electric furnace equipped with a turning table was used. Using a precision balance (accurate to 0.1 mg), 20±0.1 g of a sample (pelletized fluoropolymer) was weighed in an aluminum cup (having a mass of A) preliminarily subjected to no-load heating at 372° C. for one hour. The total mass was expressed by B.

Two samples were provided for each measurement.

These samples were quickly placed on the turning table of the electric furnace adjusted to 372° C. The number of rotations of the turning table at this time was 6 rpm.

After a lapse of 30 minutes from the point when the temperature inside the furnace recovered to 372° C., the samples were taken out and directly stored in a desiccator. After cooling for one hour or longer, the mass of each sample was weighed using the precision balance used above. The obtained mass was expressed by C.

The mass reduction at 372° C. for 30 minutes of each of the two samples was calculated by the following equation, and the average of the two was determined as the mass reduction by heating (% by mass).

Mass reduction by heating (% by mass)=[(B−C)/(B−A)]×100

The fluoropolymers used in the examples and comparative example are listed below.

Fluororesin A: powder of a polymer produced by the method described in Example 2 of JP 5526506 B (TFE/PPVE copolymer, number of unstable end groups: 146 —CH$_2$OH groups, 16 —COF groups, 6 —COOH groups, 52 —COOCH$_3$ groups)

Fluororesin B: powder of a polymer produced by the method described in Comparative Production Example 3 of JP 5526506 B (TFE/PPVE copolymer, number of unstable end groups: 57 —CH$_2$OH groups, 45 —COF groups, 2 —COOH groups, 42 —COOCH$_3$ groups)

Fluororesin C: white powder of perfluoropolymer (A) produced by the method described in Example 1 of WO 2006/123694 (TFE/PPVE/HFP copolymer containing about 0.1% by weight of PTFE, number of unstable end groups: about 600 —COOH groups)

Fluororesin D: powder of a polymer produced by the method described in Synthesis Example 1 of Example 1 of JP 5314707 B (TFE/PPVE/HFP copolymer, number of unstable end groups: 10 —CH$_2$OH groups, 3 —COF groups, 5 —COOH groups, 570 —CF$_2$H groups)

Example 1

A fluororesin A was subjected to a treatment using a twin-screw extruder including 16 cylinders to give pellets. In the twin-screw extruder, first to sixteenth cylinders each having a cylinder diameter of 32 mm and an L/D of 56 were sequentially connected. In the treatment, the fluororesin A was fed at a rate of 20 kg/hrs.

In the seventh cylinder, nitrogen was added at 1 MPa in an amount corresponding to 4% of the weight of the resin.

The eighth cylinder was set to have a vacuum degree of 80 kPa, whereby a volatile matter, O$_2$, and H$_2$O were removed.

In the tenth cylinder, a gas mixture containing nitrogen and a fluorinating agent composed of fluorine (F$_2$) was added at 1 MPa in a manner that the amount of fluorine corresponds to 2500 ppm relative to the weight of the fluororesin A.

The eleventh cylinder was set to have a vacuum degree of 80 kPa, whereby the introduced fluorine, a remaining volatile matter, O$_2$, and H$_2$O were removed. The treatment time was 150 seconds.

In the twin-screw extruder used in the treatment, the first cylinder served as a raw material supply part, second to sixth cylinders served as a plasticization zone mainly for feeding (right-handed screw) (a zone in which powder is completely melted with the fourth cylinder being provided with a return (left-handed screw) kneading disk to generate a back pressure by melt sealing), and the subsequent fifth cylinder was provided with a vent hole for removing a volatile matter produced during the melting.

The seventh cylinder was provided with kneading disks and return (left-handed screw) close bladed screws (including one return close bladed screw (L/D=0.5), two neutral disks (L/D=0.5), three return kneading disks (L/D=0.5), and one return close bladed screw (L/C=0.5)), and connected to an inactive substance introduction part (an inactive substance addition zone). The eighth cylinder was provided with a vacuum venting (an inactive substance removal zone).

The ninth cylinder was for feeding (right-handed screw). The tenth cylinder was provided with kneading disks and return close bladed screws (including one return close bladed screw (L/D=0.5), two neutral disks (L/D=0.5), three return kneading disks (L/D=0.5) and one return close bladed screw (L/D=0.5)) and connected to a fluorinating agent introduction part (a fluorinating agent addition zone). The eleventh cylinder was provided with a vacuum venting (a fluorinating agent removal zone). In Examples 1 to 8, the twin-screw extruder was operated at a body temperature of 260° C. to 380° C.

Examples 2 to 8

Purified fluoropolymers were obtained as in Example 1, except that the conditions were changed as shown in Table 2.

Comparative Example 1

A fluoropolymer was obtained as in Example 1, except that nitrogen was not introduced in the seventh cylinder.

TABLE 2

|  | Example 1 | Example 2 | Example 3 | Example 4 | Example 5 | Example 6 | Example 7 | Example 8 | Comparative Example 1 |
|---|---|---|---|---|---|---|---|---|---|
| Fluoropolymer | A | B | A | A | C | D | C | A | A |
| Inactive substance | Nitrogen | Nitrogen | Nitrogen | Nitrogen | Nitrogen | Nitrogen | Nitrogen | $CO_2$ | None |
| Amount of inactive substance (%/poly kg) | 4 | 4 | 4 | 4 | 4 | 4 | 4 | 4 | 0 |
| Introduction pressure of inactive substance (MPa) | 1 | 1 | 1 | 1 | 1 | 1 | 1 | 1 | — |
| Amount of fluorinating agent (ppm/poly kg) | 2500 | 2500 | 1250 | 500 | 2500 | 2500 | 2500 | 2500 | 2500 |
| Pressure of fluorinating agent (MPa) | 1 | 1 | 1 | 1 | 1 | 1 | 1 | 1 | 1 |
| Screw speed (rpm) | 200 | 200 | 200 | 200 | 200 | 200 | 200 | 200 | 200 |
| Number of fluoridable end groups (pcs/$10^6$ carbon atoms) | 0 | 0 | 0 | 20 | 0 | 0 | 0 | 0 | 80 |
| Mass reduction by heating (mass %) | 0.015 | 0.01 | 0.017 | 0.05 | 0.042 | 0.039 | 0.041 | 0.016 | 0.08 |

INDUSTRIAL APPLICABILITY

The production method of the disclosure can be employed for production of a fluoropolymer.

REFERENCE SIGNS LIST

1: raw material supply part
2: cylinder
3: first cylinder
4: ninth cylinder
5: introduction of inactive substance
6: discharge of inactive substance and reaction inhibitor
7: introduction of active substance
8: Removal of volatile matter and others
9: Removal of volatile matter and reaction inhibitor (Vacuum venting)
10: Introduction of inactive substance
11: Removal of inactive substance and others

The invention claimed is:

1. A method for producing a purified fluoropolymer, comprising:
   (a) melting a fluoropolymer to give a molten fluoropolymer;
   (b) reducing a reaction inhibitor in the molten fluoropolymer;
   (c) bringing the molten fluoropolymer into contact with an active substance after the step (b); and
   (d) removing a volatile matter from the molten fluoropolymer after the step (c),
   wherein the active substance is a fluorinating agent,
   wherein the reaction inhibitor is a volatile matter, $O_2$, or $H_2O$,
   wherein the temperature of step (a) is equal to or higher than the melting point of the fluoropolymer, and
   wherein the step (b) involves bringing the molten fluoropolymer into contact with an inactive substance.

2. The production method according to claim 1, wherein the fluorinating agent is $F_2$.

3. The production method according to claim 1, wherein the inactive substance is nitrogen gas or carbon dioxide gas.

4. The production method according to claim 1, wherein the fluoropolymer is a polymer containing a tetrafluoroethylene-based polymerized unit.

5. The production method according to claim 1, wherein the step (d) involves bringing the molten fluoropolymer into contact with an inactive substance.

6. The production method according to claim 1, wherein the step (b) involves bringing the molten fluoropolymer into contact with an inactive substance under pressurization.

7. The production method according to claim 1, wherein the step (c) involves bringing the molten fluoropolymer into contact with the active substance under pressurization.

* * * * *